United States Patent
Geier et al.

(10) Patent No.: US 7,774,976 B2
(45) Date of Patent: Aug. 17, 2010

(54) INSECT TRAP

(76) Inventors: Martin Geier, Carl-Maria-von-Weber-Strasse 7g, Regensburg (DE); Andreas Rose, Carl-Maria-von-Weber-Strasse 7g, Regensburg (DE); Alvaros E. Eiras, Rua Domenica 193, Bairro Itapos, Belo Horizonte (BR)

( * ) Notice: Subject to any disclaimer, the term of this patent is extended or adjusted under 35 U.S.C. 154(b) by 0 days.

(21) Appl. No.: 12/206,251

(22) Filed: Sep. 8, 2008

(65) Prior Publication Data
US 2009/0000183 A1 Jan. 1, 2009

Related U.S. Application Data

(62) Division of application No. 10/539,986, filed as application No. PCT/DE03/04162 on Dec. 17, 2003, now abandoned.

(60) Provisional application No. 60/434,563, filed on Dec. 19, 2002.

(51) Int. Cl.
A01M 1/06 (2006.01)
(52) U.S. Cl. .............................. 43/139; 43/113; 43/133
(58) Field of Classification Search ................ 43/113, 43/139, 114, 133, 107
See application file for complete search history.

(56) References Cited

U.S. PATENT DOCUMENTS

| | | | | | |
|---|---|---|---|---|---|
| 3,120,075 | A | * | 2/1964 | Barnhart, Sr. | 43/139 |
| 4,819,370 | A | * | 4/1989 | Woodruff | 43/113 |
| 5,241,779 | A | * | 9/1993 | Lee | 43/139 |
| 5,301,458 | A | * | 4/1994 | Deyoreo et al. | 43/139 |
| 5,669,176 | A | * | 9/1997 | Miller | 43/139 |
| 6,145,243 | A | * | 11/2000 | Wigton et al. | 43/139 |
| 6,574,914 | B2 | * | 6/2003 | Smith | 43/113 |
| 2002/0078620 | A1 | * | 6/2002 | Nelson et al. | 43/113 |
| 2003/0217503 | A1 | * | 11/2003 | Robison | 43/114 |

* cited by examiner

Primary Examiner—Christopher P Ellis
(74) Attorney, Agent, or Firm—Andrew Wilford

(57) ABSTRACT

An insect trap has a hollow body generally centered on an upright axis, having a central upwardly open output passage, and formed around the central output passage with an annular intake passage having a dark-colored inner surface. A light-colored foraminous wall upwardly covers the central output passage and has a surface area substantially greater than that of the intake passage. A blower in the body expels air from the body through the central output passage and through the foraminous wall at a predetermined low speed and draws air into the annular intake passage at a high speed substantially higher than the predetermined low speed. Insects attracted by the weak stream or by a contrast between the dark-colored inner surface and the light-colored foraminous wall are trapped in the annular intake passage.

20 Claims, 7 Drawing Sheets

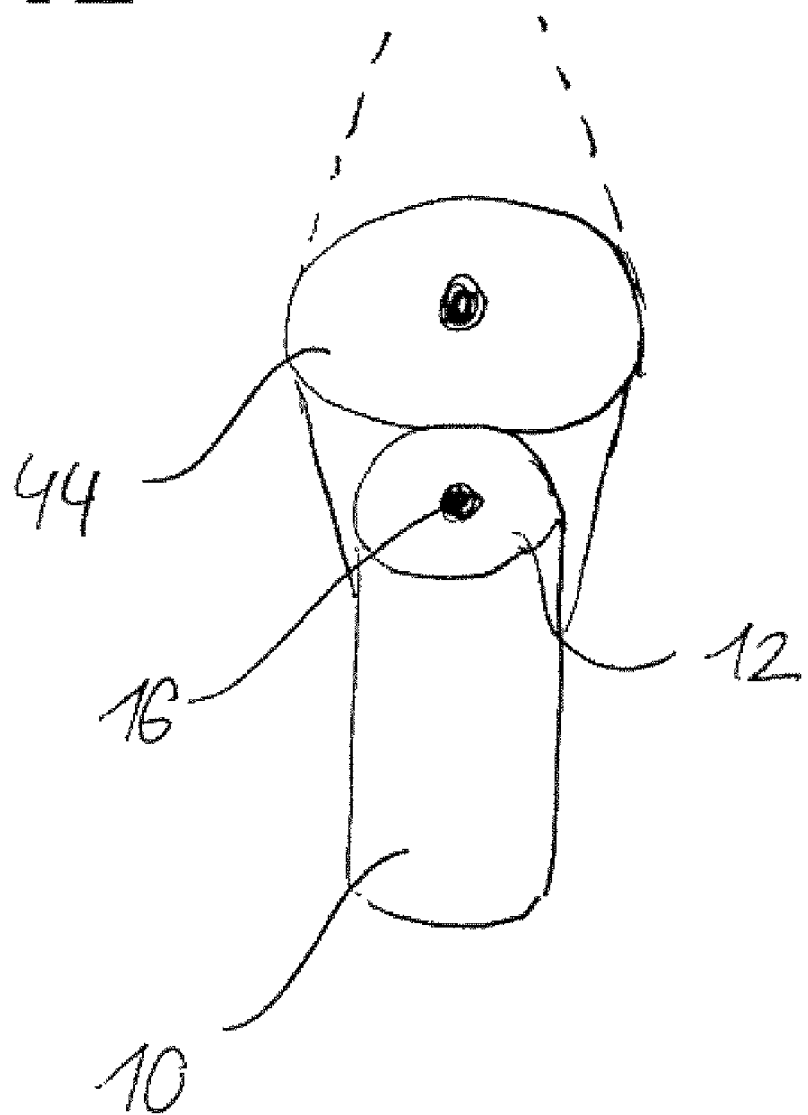

INSECT TRAP

CROSS REFERENCE TO RELATED APPLICATIONS

This application is a division of U.S. patent application Ser. No. 10/539,986 filed 7 Aug. 2006 as the US national phase of PCT application PCT/DE2003/004162, filed 17 Dec. 2003, published 1 Jul. 2004 as WO 2004/054358, and claiming the priority of German patent application 10259651.4 itself filed 18 Dec. 2002 and German patent application 60/434,563 itself filed 19 Dec. 2002, whose entire disclosures are herewith incorporated by reference.

FIELD OF THE INVENTION

The invention relates to an insect trap, in particular for flying and/or harmful insects.

BACKGROUND OF THE INVENTION

Blood-sucking insects constitute one of the most significant health issues worldwide, as they spread numerous diseases (for example malaria, yellow fever, dengue, etc.) to both humans and animals and are generally burdensome. Insecticides are used for wide-scale destruction of these pests. A further possibility for controlling and fighting pest insects is the use of traps that are principally intended for small areas, in particular for closed spaces.

Insect traps are known in many types and styles. Simplest is the use of flypaper that is coated with glue so that the insects that contact with it get stuck. Other variants emit ultraviolet light or ultrasound and in this manner draw in insect pests. There are also device that use aromatic attractants, for example along with an air stream, so that the attracted insects are sucked by the air stream into a space and held there.

Such traps are described in US 2001/0045051 and U.S. Pat. No. 6,286,249. With this type of trap an attractant is distributed by a blower inside a cylindrical tube so as to draw in insects. Once they get close to the trap, the air stream sucks them into the trap. To this end a further tube is provided around the cylindrical tube. The insects are sucked into a space between the two coaxial tubes.

With the known types of traps carbon dioxide is used, since this gas is recognized by insects as what is exhaled by humans and animals and therefore attracts them.

The effectiveness and efficiency of the hitherto known traps is however mainly limited because they cannot be fully effective to neutralize all the insects in a given room or space. In addition the traps that emit carbon dioxide are relatively expensive to make and operate.

OBJECT OF THE INVENTION

It is an object of the invention to provided an insect trap that is simple to make and also inexpensive to run and efficient.

SUMMARY OF THE INVENTION

This object of the invention is achieved by a first variant of the insect trap according to the invention, that is in particular for flying and/or pest insects and that has a planar or curved light surface region surrounding at least one dark contrast surface region. The insect trap further has means for holding, trapping and/or killing attracted insects on a surface of the insect trap and/or in its interior. This first variant of an insect trap is based on the recognition that dark objects attract many insects. Tests with this system have shown that a light surface region with a dark spot in it, for example in its center, is very attractive for certain insects and draws them. Hitherto it has only been recognized that dark objects are capable of attracting certain types of insects. The invention improves on this by providing a dark contrast region on a light background.

A variant of the insect trap according to the invention has an output surface for producing a weak air stream passing out through the surface and means for holding, trapping and/or killing attracted insects on a surface of the insect trap and/or in its interior. Tests have shown the surprising effect that a weak and uniform air stream spread over a large surface is attractive for many insects and draws them. This can be explained in that the weak air stream over a large surface area is like the warm air flow of a human or animal body that is in particular recognized by gnats (*aedes aegypti*) and blood-sucking insects and that draws them.

The two described variants of the invention can be combined with each other in that a light surface region with a dark contrast region is provided with an output surface or formed as one. This increases the effectiveness of the trap.

According to an embodiment of the invention at least the light surface region or parts of it are covered with glue and/or an insecticide. In addition at least the dark contrast surface region can be covered with glue and/or an insecticide, so that the upper surface of the trap functions to hold the attracted insects. Alternatively the insects can be killed by contact with the trap surface. This can be done by energizing the surface with electricity, for example with a screen or the like that is energized.

The weak air stream coming from the output surface preferably has an average flow speed of about 2 to 100 cm/sec, better between 3 and 50 cm/sec, and preferably from 5 to 20 cm/sec so that the weak air stream accurately imitates the convection air stream rising off a human or animal body.

A particularly preferred embodiment of the invention is characterized by an attractant that is emitted by the trap. This is based on the recognition that the smell of a human or animal body is particularly attractive for insects when it is carried by a weak uniformly spread-out air stream. There are situations in which carbon dioxide is used. This is an attractive that is contained in breathed air. Such an addition of carbon dioxide is thus particularly attractive for insects when the air flow is discontinuous and in exhalations streams. On the other hand an attractant imitating body odors is particularly attractive for insects when it is carried in a weak air or convective stream as provided for by the instant invention.

Preferably the attractant is emitted by the entire light surface region. The attractant can for example be in a coating of the upper surface in a predetermined concentration. To this end a binder is applied to the light and/or dark surface regions in which the attractant is dissolved and that is in a predetermined concentration. Such a binder an in particular be a glue to which the attracted insects stick. So that the attractant is uniformly emitted and carried off in a convective stream, the trap surface can be heated, for example by heating wires or the like.

A particularly preferred variant uses a combination of olfactory and visual attractants for the insects. Such a preferred embodiment of the invention has an output surface that is a light surface region surrounding at least one dark contrast surface region. The light surface region has an area of at least 30 $cm^2$, preferably an area of at least 100 $cm^2$ in order to be effective at a distance. Such a combined optical and olfactory effect of the insect trap according to the invention imitates particularly well the human or animal body so that such a trap is highly attractive and is therefore very effective for many insects, in particular the blood-sucking types.

A further embodiment of the invention provides that at least one intake opening for drawing in attracted insects is provided near the trap. Alternatively a plurality of intake openings are provided around the light surface region or around the output surface. In particular an annular intake opening surrounds the light surface region or the output surface. In this manner the attracted insects can be sucked into the interior or into a container in which they are collected and from which they cannot fly out. If desired this space can hold an insecticide so that the insects are killed right there.

A preferred embodiment of the invention provides that the dark contrast surface region is a dark intake passage. Thus an inner surface of the tubular intake passage is preferably provided with a dark coating so that the intake passage itself forms the contrast surface region on the light surface region. A flow speed at or in the intake passage or at or in the intake opening is at least 1 m/sec, and can in a preferred embodiment be about 2 m/sec. This ensures that insects that get near the intake passage or the intake opening are sucked in and cannot fly out. At the same time this ensures that the insects cannot fly against the air stream and escape after being caught from the interior.

A further preferred embodiment of the invention provides a blower in the trap for providing the intake flow in the intake passage or in the intake opening and/or the weak air stream from the output surface. The fan can in particular form an annular flow, drawing the air in centrally at the intake opening or through the intake passage and expelling the sucked-in air through the large output surface as a uniform weak air stream. The ratio of areas of the intake passage hd the output surface are such that the desired air speeds are obtained.

Preferably a device inside the trap uniformly supplies the attractant to the weak air stream. Such a device can be several vessels with the individual components of the attractant or different tubes with the components of the attractant, since the attractant is typically not supplied as a mixture but as individual components and is only combined with put into the air. Such an attractant can in particular be a mixture of milk acids, capron acids, and ammonia, as for example described in provisional U.S. application 60/386,582 of 7 Jun. 2002. The components and attractant mixture described in this application are incorporated by reference in this application.

The output surface can be a mesh with a light weave whose mesh size is smaller than the insects to be caught in the trap. In this manner the light surface region is formed and at the same time the trap is closed to the outside so that insects caught in it cannot fly out through the mesh.

The intake passage has preferably a minimum length that ensure s a relatively uniform flow in the passage and near the passage. A typical intake-passage length can for example be between 5 and 10 cm. The typical diameter of the intake passage can for example be between 3 and 15 cm. The dimensions of the output surface and the intake passage depend in particular on the overall size of the trap and on the desired relationship between the flow speeds in the passage and from the emitting device. Even the typical sizes of the preferred insect being trapped influence the actual dimensions of the intake passage and of the trap.

An embodiment of the invention has an additional screen upstream of the fan in the intake passage so that the sucked-in insects do not get into the interior of the trap, but are collected at the lower end of the intake passage. According to a preferred embodiment the intake passage upstream of the fan holds an insert that can if necessary be provided with glue or an insecticide and that is periodically taken out of the trap and emptied. In order to prevent that drawn-in insects fly out again, the fan can be set to run permanently. If the fan does not run all the time, it can be advantageous to provide a flared catchment from which the insects cannot fly out. With such a variant the fan is set to operate periodically.

In a preferred embodiment according to the invention the insect trap is hollow and cylindrical and has at one end the output surface and the dark intake passage in it. An end panel of the hollow cylindrical trap can be concave or convex. In addition it preferably for it to have a closed floor carrying means for supplying the attractant.

The end surface of the hollow-cylindrical trap is directed upward. The trap thus has in comparison to a trap that emits carbon dioxide, the advantage of being more easily seen by insects, since they can perceive the light surface or the outflowing attractant better than with a downwardly directed active face of the trap. Carbon-dioxide traps normally emit downward since $CO_2$ is heavier than air and naturally drops.

In an alternative embodiment of the invention the trap is spherical with an outer surface on which are distributed intake passages. At least part of an outer ball surface is formed as the output surface. Preferably generally the entire outer ball surface is formed as the output surface.

In a further embodiment a cover is provided spaced above the trap to protect it from the weather. The cover can prevent rain from getting into the trap and making it less effective. The cover can if desired by transparent so that insects see the light surface with the dark contrast spot. Alternatively, the cover can itself serve as an optical attractant. To this end it can be formed as the light surface with one or more dark contrast spots.

The trap is preferably freely hanging, for example by a string or chain from a tree, structure or other appropriate support.

The insect traps according to the invention are perfect not only for dealing with pests in closed spaces and in the open, but also for determining the insect population in a given area. For such monitoring these traps are set out in the area to be checked for a predetermined time and the number of caught insects is determined. This monitoring can serve to determine the necessity or effectivity of antipest systems before applying them and/or after using them.

BRIEF DESCRIPTION OF THE DRAWING

The invention is more closely described in the following with reference to preferred embodiments. Therein:

FIG. 12 is a pendant trap with a cover.

SPECIFIC DESCRIPTION

Figure 1:
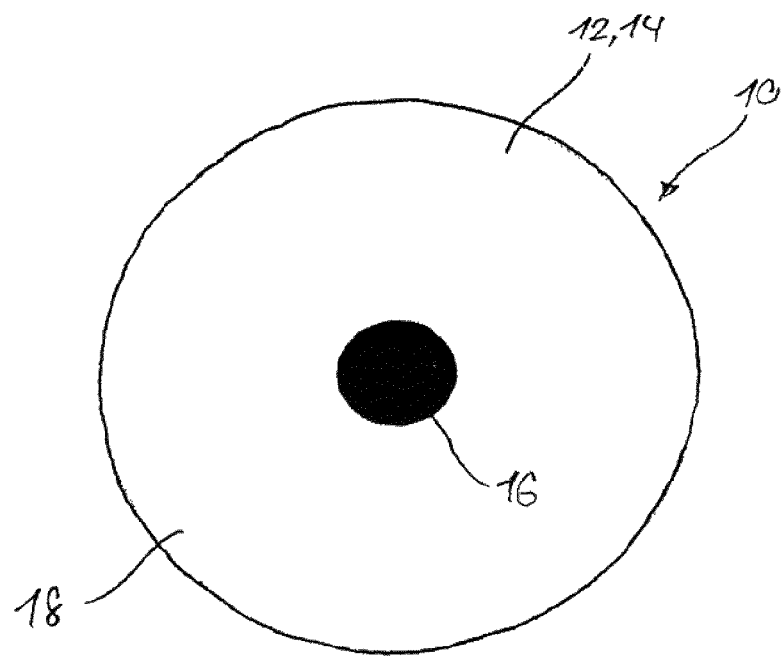
FIG. 1 is a schematic top view of an upper surface of an insect trap.

The schematic top view of FIG. 1 shows the basic principle of the optical functioning of an insect trap 10. It has a trap upper surface 18 having an outer light region 12 and a contrast region 16 inside the light region 12. The contrast region 16 is substantially darker than the light region 12, here black. The entire upper surface 18 and its parts can, according to how the trap 10 is made, be an output surface 14 that emits a weak air stream 22 (see FIGS. 3, 5, 7, and 9). While the trap upper surface 18 is shown in the drawing as being circular, any other shape can be used. The trap upper surface 18 does not have to be planar but can be curved inward or outward.

Figure 2:
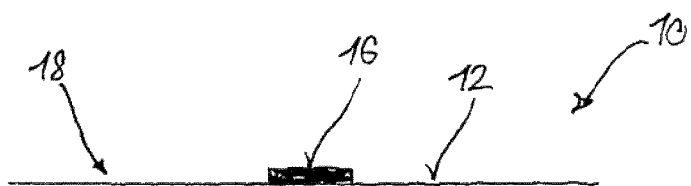
FIG. 2 is a schematic section through a first variant of the insect trap.

FIG. 2 shows a simple first variant of the insect trap 10 in a schematic sectional view. The uniformly light region 12 on the trap upper surface 18 and the generally central contrast region 16 are shown. Such a trap attracts purely optically, since a dark or black contrast against a light background is very attractive for many insects and they fly toward it. The dark contrast region 16 can be treated with glue or an insecticide so that the insects that land on it are trapped and/or killed.

Figure 3:
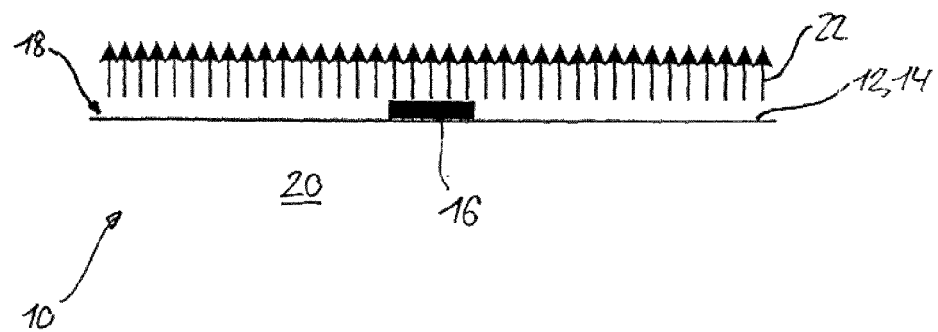
FIGS. 3 to 5 are schematic sections through alternative variants of insect traps.

FIG. 3 shows in another schematic section a second variant of an insect trap 10 where the light region 12 serves as an output surface 14. A weak air stream 22 flows out of this output surface 14 with a flow speed of less than 100 cm/sec. In particular the flow speed of the weak air stream 22 can be about 5 to 20 cm/sec and thus apes a convection stream from human or animal skin so as to be attractive to insects. The weak air stream 22 can move out of an output surface 14 formed as a mesh. Even the contrast region 16 in the middle of the light surface 12 forming the output surface 14 can be an output surface. This second variant uses the optical effect of the dark contrast spot in the center of the mechanical attractant of the weak air stream as has been found attractive for many insects s it imitates the warm convective air flow off a skin surface. It has been shown extremely effective in tests, as blood-sucking insects are attracted by such an air stream which they mistake for the convective air flow off a body.

Figure 4:
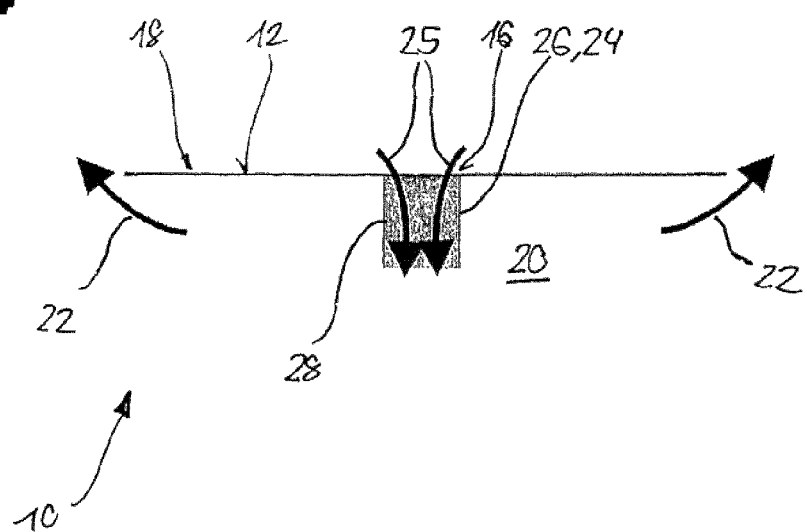

FIG. 4 shows a variant of the insect trap 10 according to the invention in schematic section. This variant produces a weak air stream 22 outside the light region 12. The contract region 16 is formed as an intake opening 24, in the illustrated embodiment connected to an intake passage through which an intake stream 25 moves into an interior 20 of the insect trap 10. The weak air stream 22 in this embodiment of the insect trap 10 can also carry an attractant that draws the desired insects. The attractant can imitate emissions of a human or animal body and be comprised of several components that are mixed together in the stream 22.

The intake stream 25 is at least strong enough that an insect that gets near it is sucked into the intake passage 26 and cannot get out. When the intake passage 26 has a dark coating on its inner surface 28 it acts as a contrast region 16 so that this trap has optical, mechanical (via the air stream), and olfactory (by the attractant) action. Such a combination effect has a high trapping rate since the insects are stimulated and attracted in several ways.

Figure 5:
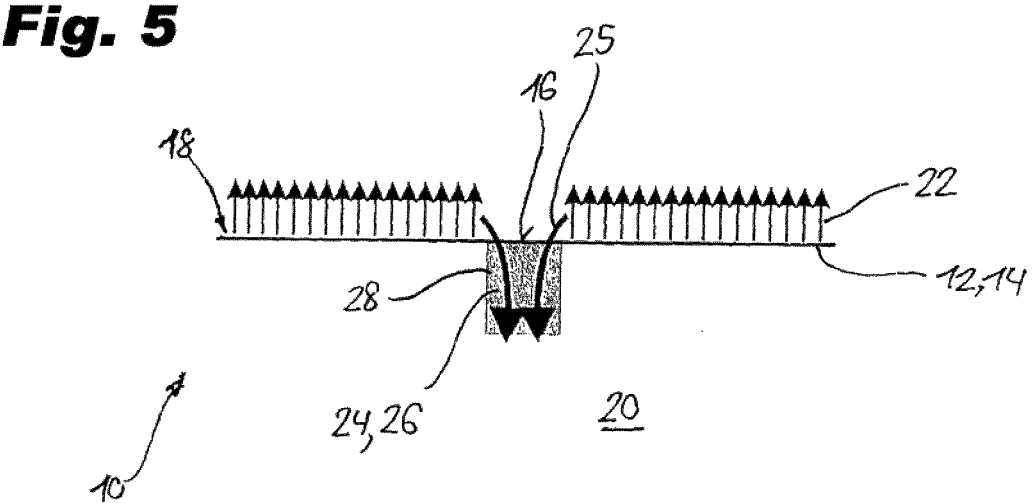

FIG. 5 shows a schematic section through a further variant of the insect trap 10 according to the invention where the light region 12 is formed as an output surface 14 through which the weak air stream 22 passes. The contrast region 16 is again a dark-coated intake opening 24 or passage 26 through which flows a strong intake stream 25 with a flow speed of more than 1 m/sec, preferably 2 m/sec or more. Insects attracted by the weak air stream 22 or the contrast region 16 are sucked through the intake passage 26 into the trap interior 20. Preferably an attractant can be carried by the weak air stream 22.

Figure 6:
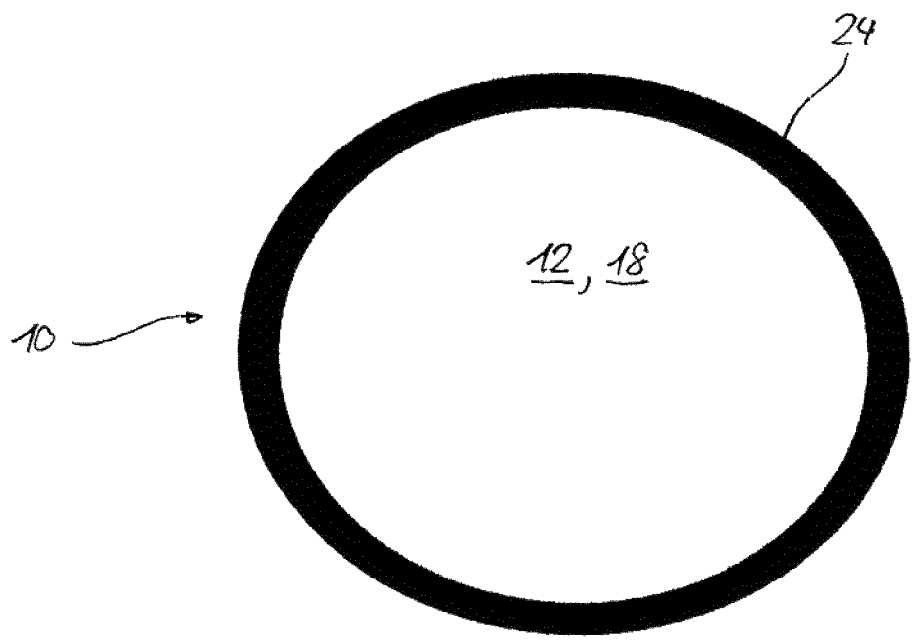
FIG. 6 is a schematic top view of a further alternative variant of an insect trap.
Figure 7:
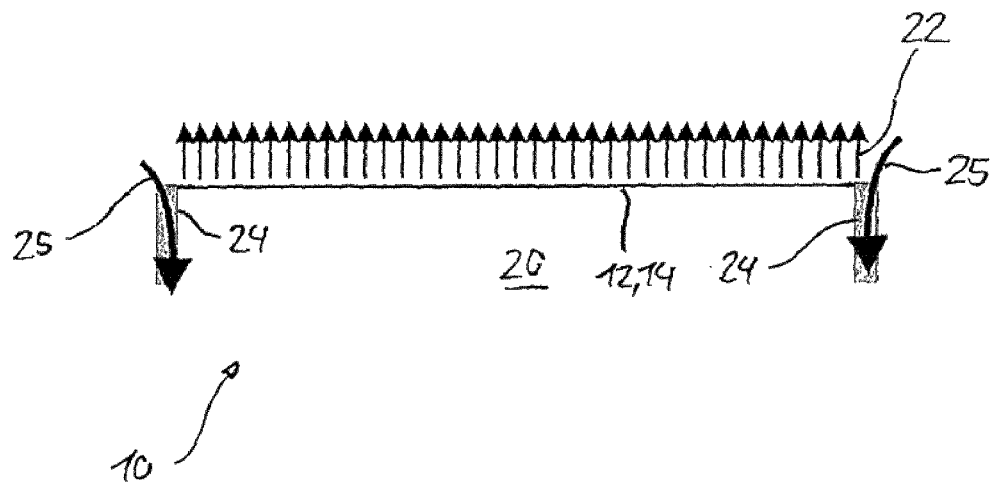
FIG. 7 is a schematic section through the trap of FIG. 6.

FIGS. 6 and 7 show an alternative variant of an insect trap 10 where the trap upper surface 18 is formed as a light region 12 with an annular surrounding intake opening 24. The intake opening 24 serves for producing an intake stream 25 into the interior 20 of the insect trap 10. Here also the light region 12 is formed as an output surface 14 through which the weak air stream 22 passes. The air stream 22 can even as described carry an attractant.

Figure 8:
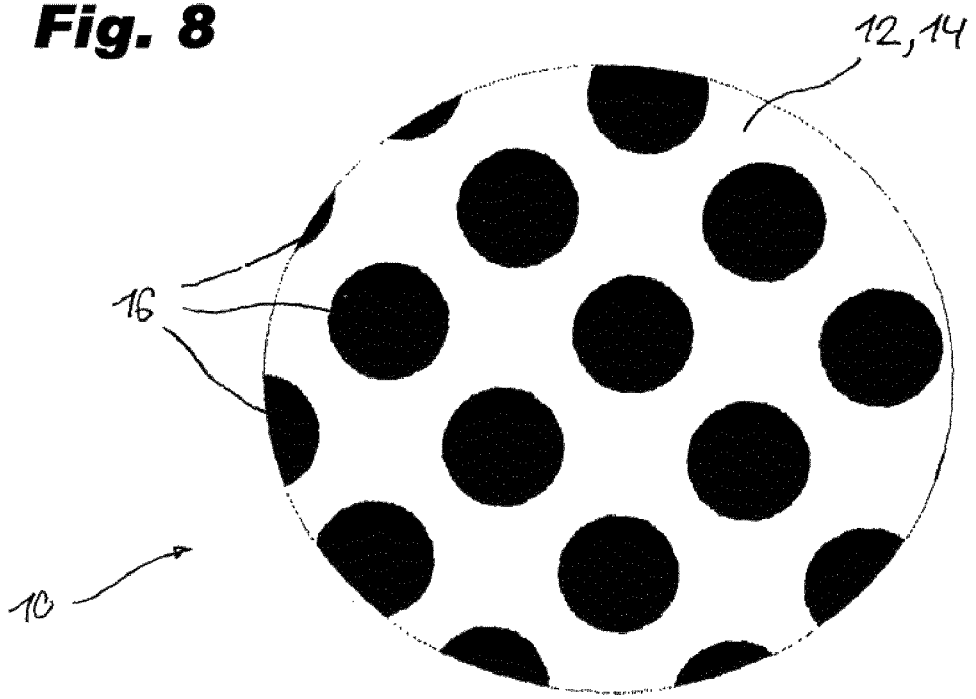
FIG. 8 is a schematic top view of a further variant of the insect trap.
Figure 9:
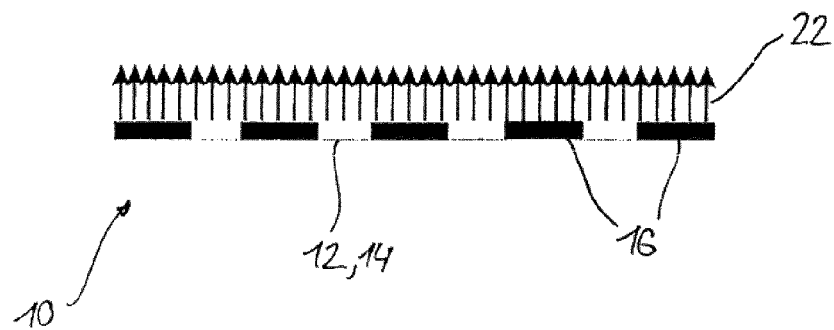
FIG. 9 is a schematic section through the trap of FIG. 8.

FIGS. 8 and 9 show a further alternative variant where several contrast regions 16 are provided on a light region 12. Here only the light regions 12 or the entire trap upper surface 18 can form an output surface 14 through which the weak air stream 22 flows to the outside. Even with this variant the weak air stream can carry an attractant.

Figure 10:
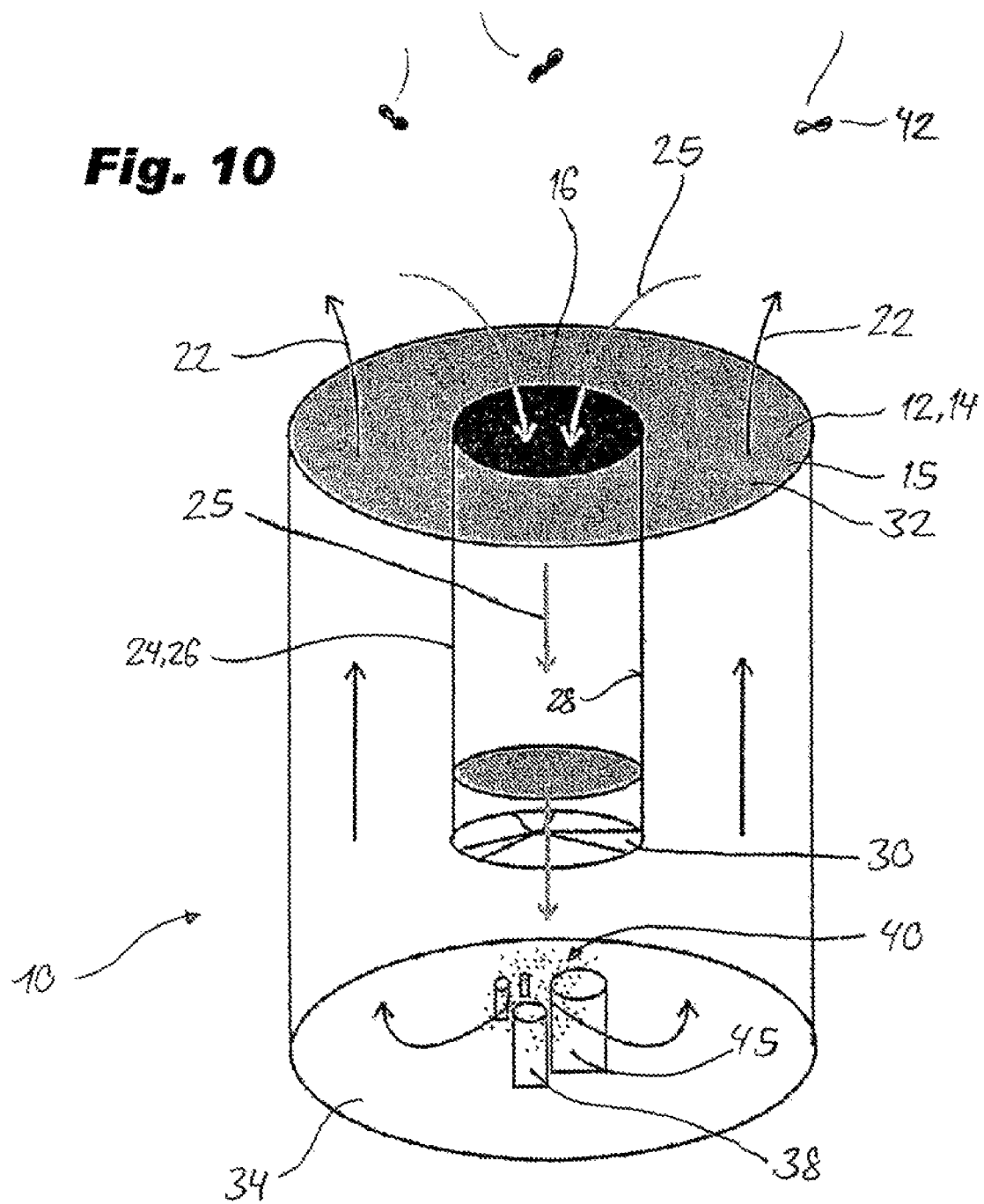
FIG. 10 is a schematic perspective view of an insect trap according to the invention.

An entire insect trap 10 is shown in FIG. 10. The insect trap 10 has a cylindrical body defining an interior 20 and having an end panel forming the trap upper surface 18. The trap upper surface 18 has a light region 12 formed as an output surface and that has a central contrast region 16 that in the illustrated embodiment is formed as an intake passage with a dark-coated inner surface 28. The light surface 12 can be formed by a foraminous wall or mesh 15 that is spanned on the hollow cylindrical trap and through which the weak air stream 22 moves outward.

At the lower end of the intake passage 26 is a fan or blower 30 that produces the intake stream 25 into the interior 20 of the insect trap 10. A floor 34 of the interior 20 has several attractant holders 38 that each emit a component of an attractant 40 in the desired concentration so that the attractant 40 is optimally mixed and expelled outward in the weak air stream 22. The light region 12 and the diameter of the intake passage 26 are such that the one fan 30 serves both to produced the desired intake stream of about 2 m/sec and the desired weak air stream of 5 to 20 cm/sec. Preferably there is a screen upstream of the fan 30 to prevent the insects from getting inside it.

A particularly advantageous embodiment provides an insert 45 in the intake passage 26 that can be taken out and emptied once it is full of insects. The intake stream 25 is at least strong enough that insects 42 near the trap 10 are sucked into the intake passage 26 and cannot escape.

Figure 11:
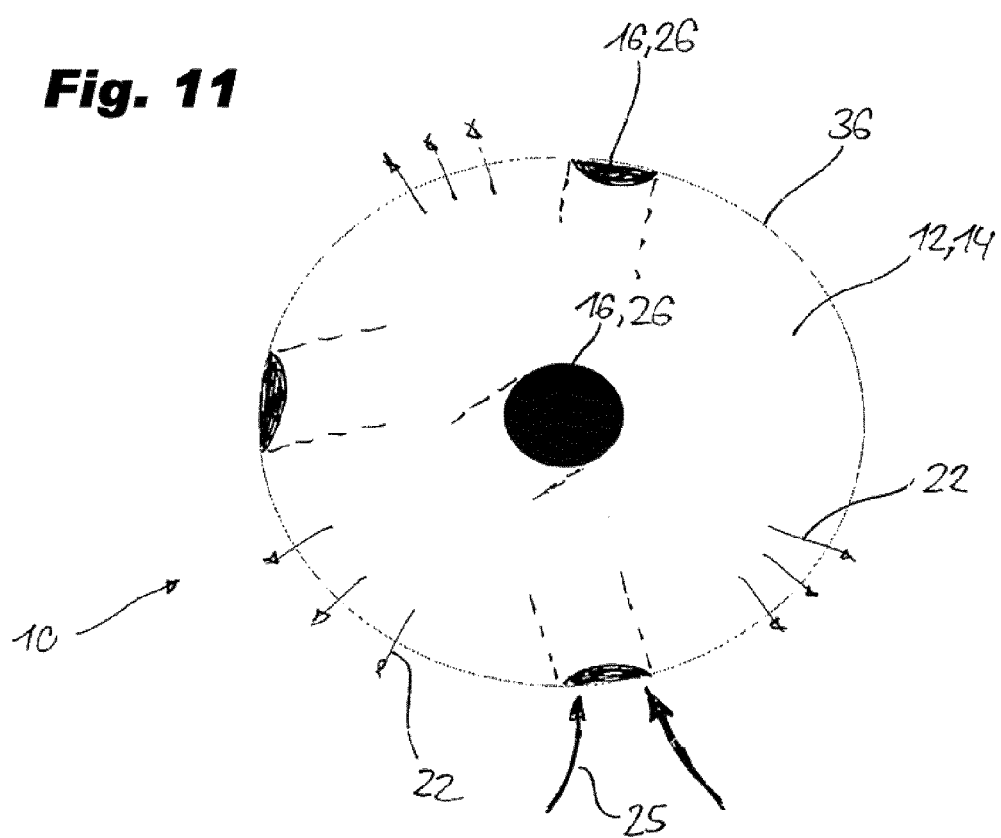
FIG. 11 is a diagram of an alternative variant of an insect trap according to the invention.

FIG. 11 shows a schematic representation of an alternative embodiment of the insect trap that in this case is formed as a sphere. The sphere outer surface 36 of the insect trap 10 can be an output surface 14. preferably several intake passages 26 are distributed over the ball surface so that at least one dark contrast region 16 is visible from any angle on the light ball surface. The spherical insect trap 10 according to FIG. 11 is more effective than the cylindrical embodiment of FIG. 10 as a result of its larger effective surface area, since the optical component with the dark contrast regions 16 of the intake passages 26 is effective in all directions.

In all the described embodiments that have a weak air stream 22 moving through an output surface 14 this can also serve to carry an attractant 40. The weak air stream 22 imitates a convective updraft of a human or animal body. The attractant 40 can be like human or animal emanations. Preferably other attractants can be used that draw insects.

The contrast region 16 inside the light region 12 is preferably sufficiently dark that it optically attracts the insects 42. Tests have proven that individual dark contrast regions on a light background attract many insects so that the system of this invention can operate purely optically.

Finally, FIG. 12 shows a pendant trap 10 with a cover 44 spaced above it. The trap 10 can have any shape. for example a hollow cylinder or a ball corresponding to FIG. 10 or 11. The cover 44 can preferably be transparent so as not to shield the light regions 12 of the trap with the dark contrast regions from the insects. Alternatively the cover 44 itself can be a light region with dark contrast regions in it, in order to draw insects from a distance.

The insect trap according to the invention is particularly effective for gnats, mosquitoes, and other stinging and/or blood-sucking flying insects.

We claim:

1. An insect trap comprising:
    a hollow body generally centered on an upright axis, having a central upwardly open passage, and formed around the central passage with an annular passage, one of the passages having a dark-colored inner surface and an upwardly open mouth;
    a light-colored foraminous wall upwardly covering the other of the passages, the foraminous wall having a surface area substantially greater than that of the mouth of the one passage;
    blower means in the body for drawing air into the body through the one passage at a high speed and for expelling the air as a weak stream from the body through the other passage and through the foraminous wall at a predetermined low speed lower than the high speed; and
    means for trapping insects attracted by the weak stream or by a contrast between the dark-colored inner surface and the light-colored foraminous wall in the one passage.

2. The insect trap defined in claim 1 wherein the foraminous wall has a surface area of at least 30 cm$^2$.

3. The insect trap defined in claim 1 wherein the foraminous wall has a surface area of at least 100 cm$^2$.

4. The insect trap defined in claim 1 wherein the high speed is 2 cm/sec to 100 cm/sec.

5. The insect trap defined in claim 4 wherein the high speed is between 5 cm/sec and 20 cm/sec.

6. The insect trap defined in claim 1, further comprising a hollow body partially formed by the foraminous wall.

7. The insect trap defined in claim 6 wherein the blower means is inside the body.

8. The insect trap defined in claim 6 wherein the blower means has an intake connected only to the one passage and an output connected only to the other passage.

9. The insect trap defined in claim 8 wherein the high speed is at least 1 m/sec.

10. The insect trap defined in claim 9 wherein the high speed is at least about ten times greater than the slow speed.

11. The insect trap defined in claim 6 wherein the foraminous wall is a generally horizontal upper surface of an upper end of the body.

12. The insect trap defined in claim 11 wherein the body is centered on an upright axis.

13. The insect trap defined in claim 1 wherein the body has a substantially closed floor underneath the blower means and substantially closed side walls extending axially between the floor and an upper end of the body.

14. The insect trap defined in claim 13 wherein the side walls form an upright tubular cylinder centered on the axis.

15. The insect trap defined in claim 13, further comprising a screen in the one passage upstream of an intake of the blower means.

16. The insect trap defined in claim 13, further comprising means in the body for emitting an attractant to be carried by the weak air stream through the foraminous wall out of the body.

17. The insect trap defined in claim 16 wherein the means for emitting includes a plurality of separate vessels each holding a respective component of the attractant.

18. The insect trap defined in claim 13, further comprising a cover suspended spacedly above the body and oriented to shield the body from above.

19. The insect trap defined in claim 1 wherein the central passage is the one passage.

20. The insect trap defined in claim 1 wherein the central passage is the other passage.

* * * * *

UNITED STATES PATENT AND TRADEMARK OFFICE
CERTIFICATE OF CORRECTION

| | | |
|---|---|---|
| PATENT NO. | : 7,774,976 B2 | Page 1 of 1 |
| APPLICATION NO. | : 12/206251 | |
| DATED | : August 17, 2010 | |
| INVENTOR(S) | : Martin Geier, Andreas Rose and Alvaro E. Eiras | |

It is certified that error appears in the above-identified patent and that said Letters Patent is hereby corrected as shown below:

In Column 1, Lines 5 and 6, under Inventors (76):

The spelling of the third inventor's name should be changed from "Alvaros E. Eiras"

To -- Alvaro E. Eiras --
and

The city in his address should be changed from "Bairro Itapos"

To -- Bairro Itapoa -- respectively.

Signed and Sealed this
Twenty-eighth Day of December, 2010

David J. Kappos
*Director of the United States Patent and Trademark Office*